(12) United States Patent
Okita et al.

(10) Patent No.: US 10,487,691 B2
(45) Date of Patent: Nov. 26, 2019

(54) ROTARY MACHINE UNIT

(71) Applicant: Kobe Steel, Ltd., Hyogo (JP)

(72) Inventors: Keisuke Okita, Kobe (JP); Atsushi Yoshida, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 334 days.

(21) Appl. No.: 15/502,377

(22) PCT Filed: Aug. 3, 2015

(86) PCT No.: PCT/JP2015/071942
§ 371 (c)(1),
(2) Date: Feb. 7, 2017

(87) PCT Pub. No.: WO2016/039040
PCT Pub. Date: Mar. 17, 2016

(65) Prior Publication Data
US 2017/0234164 A1    Aug. 17, 2017

(30) Foreign Application Priority Data

Sep. 9, 2014   (JP) .................................. 2014-182925

(51) Int. Cl.
*F01D 25/24* (2006.01)
*F01D 25/28* (2006.01)
(Continued)

(52) U.S. Cl.
CPC ............. *F01D 25/26* (2013.01); *F01D 25/28* (2013.01); *F16B 7/20* (2013.01)

(58) Field of Classification Search
CPC .......... F01D 25/24; F01D 25/26; F01D 25/28; Y10T 403/21; Y10T 403/217; F16B 2200/50; F16B 2200/503; F16B 2200/506
See application file for complete search history.

(56) References Cited

U.S. PATENT DOCUMENTS 4,086,012 A * 4/1978 Buckley ................... B63B 1/28
403/2
5,503,490 A * 4/1996 Melton .................. F01D 25/243
403/28
(Continued)

FOREIGN PATENT DOCUMENTS

JP   H10-103009 A   4/1998
JP   2001-065480 A   3/2001
(Continued)

OTHER PUBLICATIONS

International Search Report issued in PCT/JP2015/071942; dated Nov. 2, 2015.
Written Opinion issued in PCT/JP2015/071942; dated Nov. 2, 2015.

*Primary Examiner* — Michael P Ferguson
(74) *Attorney, Agent, or Firm* — Studebaker & Brackett PC

(57) ABSTRACT

A rotary machine unit equipped with rotary shaft provided so as to penetrate the respective opposing surfaces of a first casing and a second casing arranged opposing one another, said rotary machine unit also being equipped with at least two engagement mechanisms equipped with a first engaging part provided on the opposing surface of the first casing and extending radially along the direction from the center part penetrated by the rotary shaft toward the circumferential edge part, and a second engaging part provided on the opposing surface of the second casing so as to engage the first engaging part in a state in which the first engaging part is able to move in the extension direction of the first engaging part. The engagement mechanisms are provided inclined with respect to one another when viewed from the axial direction of the rotary shaft.

7 Claims, 5 Drawing Sheets

(51) Int. Cl.
  *F01D 25/26* (2006.01)
  *F16B 7/20* (2006.01)

(56) References Cited

U.S. PATENT DOCUMENTS

| | | | |
|---|---|---|---|
| 6,092,986 A | 7/2000 | Oeynhausen et al. | |
| 6,485,254 B1* | 11/2002 | Davis | F04D 19/04 |
| | | | 285/225 |
| 2010/0046868 A1* | 2/2010 | Belmonte | F01D 25/24 |
| | | | 384/286 |
| 2011/0116919 A1* | 5/2011 | Burdgick | F01D 5/005 |
| | | | 415/209.2 |
| 2013/0202428 A1 | 8/2013 | Renard et al. | |
| 2014/0250915 A1* | 9/2014 | Swan | F02C 7/20 |
| | | | 60/796 |
| 2015/0125286 A1* | 5/2015 | Suciu | F01D 25/28 |
| | | | 415/201 |

FOREIGN PATENT DOCUMENTS

| | | |
|---|---|---|
| JP | 2001-508146 A | 6/2001 |
| JP | 2009-207212 A | 9/2009 |
| KR | 10-2013-0143027 A | 12/2013 |

\* cited by examiner

ROTARY MACHINE UNIT

TECHNICAL FIELD

The present invention relates to a rotary machine unit. More particularly, the present invention relates to a rotary machine unit equipped with a rotary shaft provided to extend through respective opposing surfaces of a first casing and a second casing that are arranged opposite to each other.

BACKGROUND ART

In order to normally operate a rotary machine unit equipped with a rotary shaft, it is important that the rotary shaft is appropriately centered. A technique to appropriately center the rotary shaft has been conventionally known as described in, for example, Patent Documents 1 and 2. In Patent Document 1, at the time of assembling a motor/generator, a rotor is guided to an appropriate position by a centering guide arranged at a stator; thereby, a rotary shaft connected to the rotor is appropriately centered. Also, a screw compressor of Patent Document 2 can be assembled in a state where a rotary shaft is surely centered by a centering guide arranged between a motor and a compression portion.

CITATION LIST

Patent Document

Patent Document 1: JP 2009-207212A
Patent Document 2: JP 2001-065480A

SUMMARY OF THE INVENTION

Technical Problem

For example, a first casing is subject to a large change of temperature compared to a second casing during the operation of a rotary machine unit equipped with a rotary shaft provided to extend through respective opposing surfaces of the first casing and the second casing that are arranged opposite to each other. In such case, the amount of thermal deformation (the amount of expansion or shrinkage) of the first casing is larger than the amount of thermal deformation of the second casing. Therefore, even if initially the rotary shaft is appropriately centered with respect to the first casing and the second casing, during the operation of the rotary machine unit, the rotary shaft may be misaligned with respect to the first casing, the amount of thermal deformation of which is large. When the amount of such misalignment is large, the rotary shaft makes contact with the first casing (or a sealing member provided in the first casing) and thus may cause problems of energy loss, seizing of the rotary shaft, or the like. These problems are caused by the case where during the operation of the rotary machine unit, the first casing is largely thermally deformed compared to the second casing. Accordingly, even if the technique described in Patent Documents 1 and 2 in which only centering during assembly is considered is employed, the aforementioned problems cannot be solved.

It is thus an object of the present invention to provide a rotary machine unit equipped with a rotary shaft which is provided to extend through respective opposing surfaces of a first casing and a second casing that are arranged opposite to each other, wherein even if the first casing is subject to a large change of temperature compared to the second casing, the misalignment of the rotary shaft with respect to the first casing is inhibited.

Solution to Problem

In order to attain the aforementioned object, a rotary machine unit according to the present invention is provided, the rotary machine unit being equipped with a rotary shaft provided to extend through respective opposing surfaces of a first casing and a second casing that are arranged opposite to each other, the rotary machine unit being characterized by at least two engagement mechanisms, each of the engagement mechanisms including: a first engaging portion provided on the opposing surface of the first casing to linearly extend in a direction from a center through which the rotary shaft extends to a circumferential rim; and a second engaging portion provided on the opposing surface of the second casing so that the first engaging portion is engaged movably with the second engaging portion in an extending direction of the first engaging portion, wherein the engagement mechanisms are provided to be inclined with respect to each other when viewed in an axial direction of the rotary shaft.

Advantageous Effects of Invention

According to the present invention, the first engaging portion is provided on the opposing surface of the first casing to linearly extend in the direction from the center through which the rotary shaft extends to the circumferential rim. The first engaging portion is movable in the extending direction of the first engaging portion while being engaged with the second engaging portion formed on the opposing surface of the second casing. At least the two engagement mechanisms each configured by the first engaging portion and the second engaging portion are provided to be inclined with respect to each other when viewed in the axial direction of the rotary shaft. Therefore, if the first casing is thermally deformed in an environment where the first casing is subject to a large change of temperature compared to the second casing, each of the first engaging portions is guided by a corresponding one of the second engaging portions to radially move; thereby, the opposing surface of the first casing substantially concentrically expands or shrinks. As a result, a displacement is scarcely generated in the center of the opposing surface of the first casing through which the rotary shaft extends; therefore, a misalignment of the rotary shaft with respect to the first casing can be inhibited.

DESCRIPTION OF EMBODIMENTS

Figure 1:
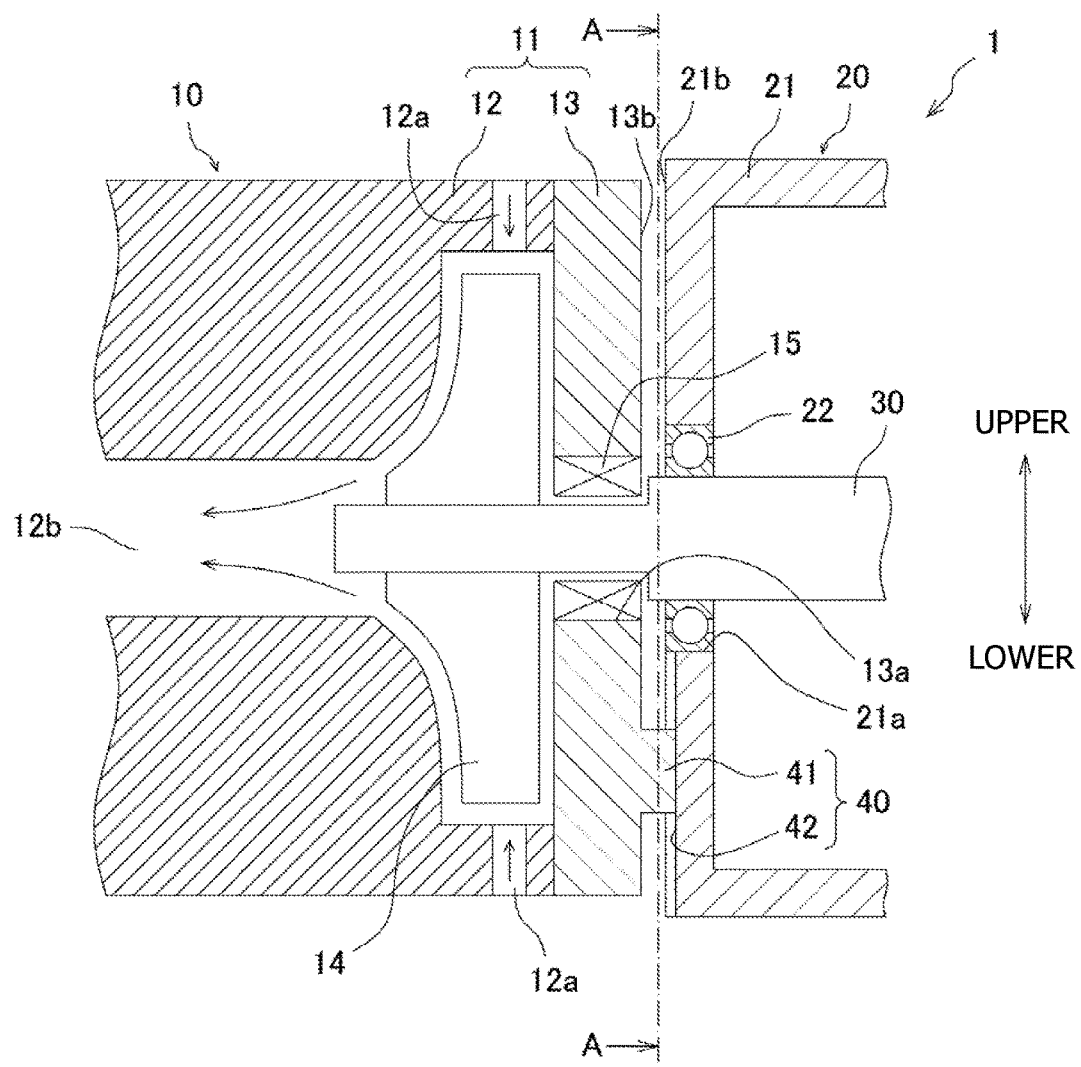
FIG. 1 is a vertical cross-sectional view of an example of a rotary machine unit according to an embodiment.

An embodiment of a rotary machine unit according to the present invention will be described with reference to the drawings. FIG. 1 is a vertical cross-sectional view of an example of the rotary machine unit of the embodiment. A rotary machine unit 1 of the present embodiment is configured to introduce high-temperature compressed air, for example, discharged from a factory, into an expansion turbine 10 and supply rotative power generated by the compressed air, via a speed increaser 20 to another device.

Expansion Turbine

The basic structure of the expansion turbine 10 is similar to the structure of a general compressor but is different from the compressor as follows. In other words, in the compressor, fluid is supplied to an impeller rotatably driven by a motor; thereby, the fluid is compressed. On the other hand, the expansion turbine 10 is configured so that fluid is supplied to a turbine runner 14 corresponding to the impeller and the turbine runner 14 is rotated by the fluid, therefore functioning as a fluid machine for converting kinetic energy of the fluid to rotational kinetic energy.

The expansion turbine 10 is configured so that the turbine runner 14 fixed to an end portion of a rotary shaft 30 is arranged in a turbine casing 11 configured by a cylindrical main body 12 and a disk-shaped cover portion 13 for closing an end portion of the main body 12. Inlets 12a for radially supply the fluid to the turbine runner 14 and an outlet 12b for axially discharging the fluid from the turbine runner 14 are formed in the main body 12. In addition, the turbine runner 14 is rotated by the fluid supplied from the inlets 12a to the turbine runner 14, and the fluid expanded in the rotation process is discharged from the outlet 12b (see the arrows in FIG. 1).

A through-hole 13a is formed in the center of the cover portion 13 of the turbine casing 11. A sealing member 15 is provided at the inner side of the through-hole 13a, and the rotary shaft 30 extends through the sealing member 15. A small clearance is provided between the sealing member 15 and the rotary shaft 30 so as not to disturb the rotation of the rotary shaft 30; however, the clearance is designed to have a minimum dimension for preventing leakage of the fluid as much as possible.

Speed Increaser

The speed increaser 20 is a device to increase the rotative power obtained in the expansion turbine 10. Specifically, a speed increasing mechanism (not shown) connected to the rotary shaft 30 is arranged in a gear casing 21. A through-hole 21a through which the rotary shaft 30 is to be inserted is formed in a wall surface of the gear casing 21, which is located adjacent to the expansion turbine 10. A bearing 22 supporting the rotary shaft 30 so that the rotary shaft 30 is rotatable is provided in the through-hole 21a. The gear casing 21 of the present embodiment has a cylindrical shape extending along the rotary shaft 30, and the gear casing 21 is configured so that the upper half is openable and closable, for example, for doing maintenance on the speed increasing mechanism inside the gear casing 21. The specific configuration of the gear casing 21 is not limited to the foregoing configuration.

Misalignment

In the rotary machine unit 1, the turbine casing 11 and the gear casing 21 are arranged opposite to each other, and the rotary shaft 30 is provided to extend through respective opposing surfaces 13b and 21b of the turbine casing 11 and the gear casing 21. At the time of assembly of the rotary machine unit 1, the rotary shaft 30 is supported on the bearing 22 and is appropriately centered with respect to the turbine casing 11 (the cover portion 13).

Here, when the high-temperature fluid is supplied to the expansion turbine 10, the temperature of the turbine casing 11 significantly increases. Meanwhile, since the gear casing 21 is arranged to be separated from the turbine casing 11, the amount of heat transfer from the expansion turbine 10 is small. Therefore, the temperature of the gear casing 21 does not increase highly. Consequently, the amount of thermal deformation (here, the amount of expansion) of the turbine casing 11 is larger than that of the gear casing 21. It is not necessary that the turbine casing 11 and the gear casing 21 are arranged with an interval therebetween. Alternatively, the turbine casing 11 and the gear casing 21 may be arranged in a state where the opposing surfaces 13b, 21b are in contact with each other, or the turbine casing 11 and the gear casing 21 may be arranged with a heat insulating material provided therebetween.

The foregoing rotary machine unit 1 is conventionally provided with a support portion (not shown) protruding from a lower end portion of the opposing surface 21b of the gear casing 21 toward the turbine casing 11, and the turbine casing 11 and the gear casing 21 are connected by a bolt or the like in a state where the turbine casing 11 (the cover portion 13) is supported by the support portion. Therefore, if the turbine casing 11 is thermally expanded, the more the turbine casing 11 is separated from the support portion, the more a displacement of the turbine casing 11 with respect to the gear casing 21 increases. As a result, the rotary shaft 30 may be misaligned with respect to the turbine casing 11. When the amount of such misalignment exceeds the amount of the clearance between the sealing member 15 and the rotary shaft 30, the rotary shaft 30 comes into contact with the sealing member 15; therefore, problems of energy loss, seizing of the rotary shaft, or the like may occur.

Engagement Mechanism

Figure 2:
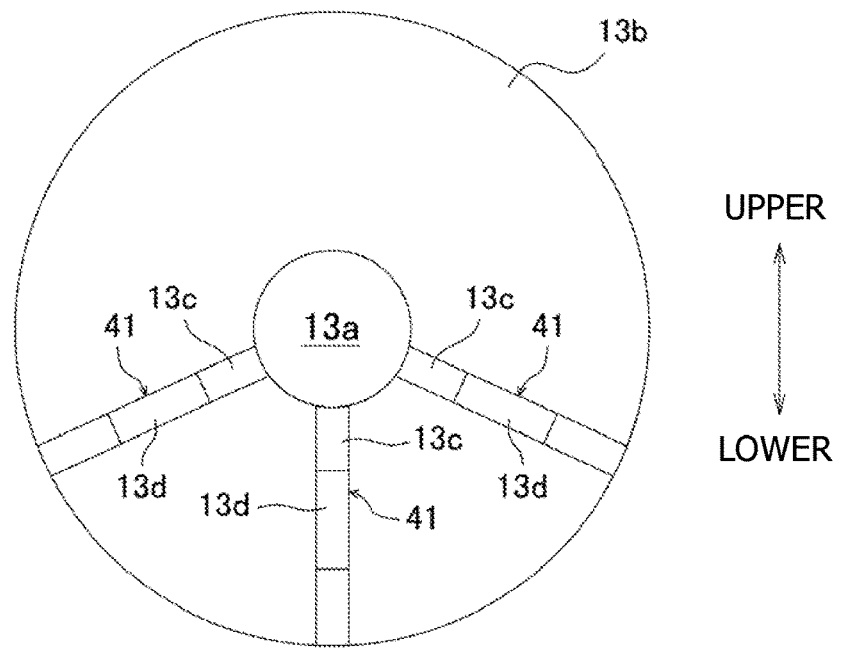
FIG. 2 is a view of an opposing surface of a turbine casing.
Figure 3:
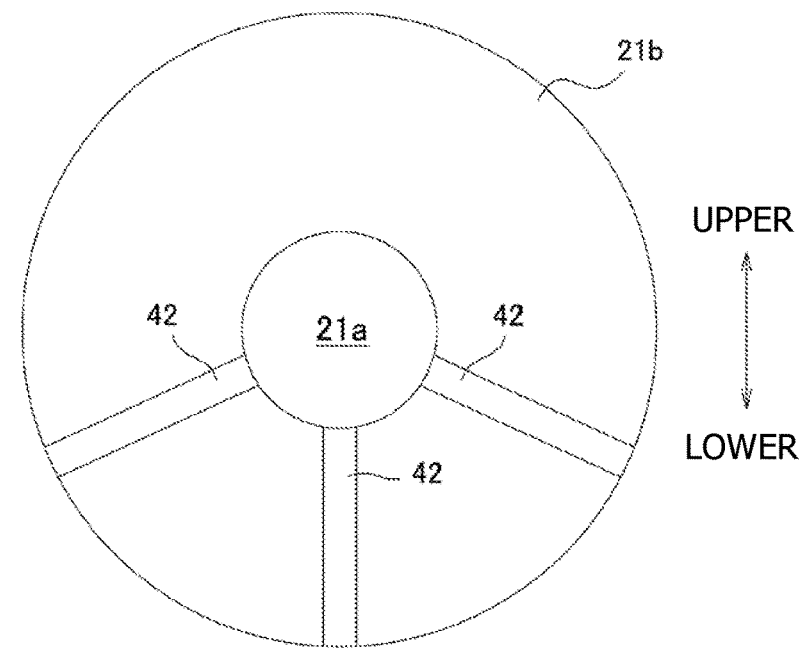
FIG. 3 is a view of an opposing surface of a gear casing.

In order to avoid the foregoing problems, a method to connect the turbine casing 11 and the gear casing 21 is elaborately designed in the rotary machine unit 1 of the present embodiment. FIG. 2 is a view of the opposing surface 13b of the turbine casing 11, and FIG. 3 is a view of the opposing surface 21b of the gear casing 21. The sealing member 15 and the bearing 22 are not shown in these drawings.

As shown in FIG. 2, three key grooves 13c are linearly formed in the circular opposing surface 13b of the turbine casing 11 so as to radially extend. A key member 13d is fixed in each of the key grooves 13c. The height of the key member 13d is larger than the depth of the key groove 13c and the key member 13d protrudes from the key groove 13c, thereby forming a protrusion 41. All the three protrusions 41 formed in this manner are provided in a lower half area of the opposing surface 13b and are symmetrically arranged with respect to a vertical plane. Each protrusion 41 is not limited to a portion configured by a combination of the key groove 13c and the key member 13d. Alternatively, as long as the protrusion 41 protrudes from the opposing surface 13b toward the opposing surface 21b of the gear casing 21, the protrusion 41 may have any configuration.

As shown in FIG. 3, in the circular opposing surface 21b of the gear casing 21, three grooved recesses 42 are provided at positions corresponding to the three protrusions 41 arranged on the opposing surface 13b of the turbine casing 11, and the recesses 42 are linearly formed so as to radially extend. The width of each recess 42 is larger than the width of each protrusion 41. While being engaged with the recess 42, the protrusion 41 can move radially (in an extending direction of the protrusion 41). The widths of the protrusion 41 and the recess 42 are determined so that even if the protrusion 41 is thermally expanded, the protrusion 41 can be kept movable in the recess 42. When viewed in an axial direction of the rotary shaft 30, the recess 42 of the present embodiment is provided to extend entirely between the center of the opposing surface 21b (the bearing 22) and a circumferential rim of the opposing surface 21b. Alternatively, the recess 42 may terminate at a location closer to the circumferential rim of the opposing surface 21b than the center of the opposing surface 21b. Conversely, the recess 42 may terminate at a location closer to the center than the circumferential rim.

Figure 4:
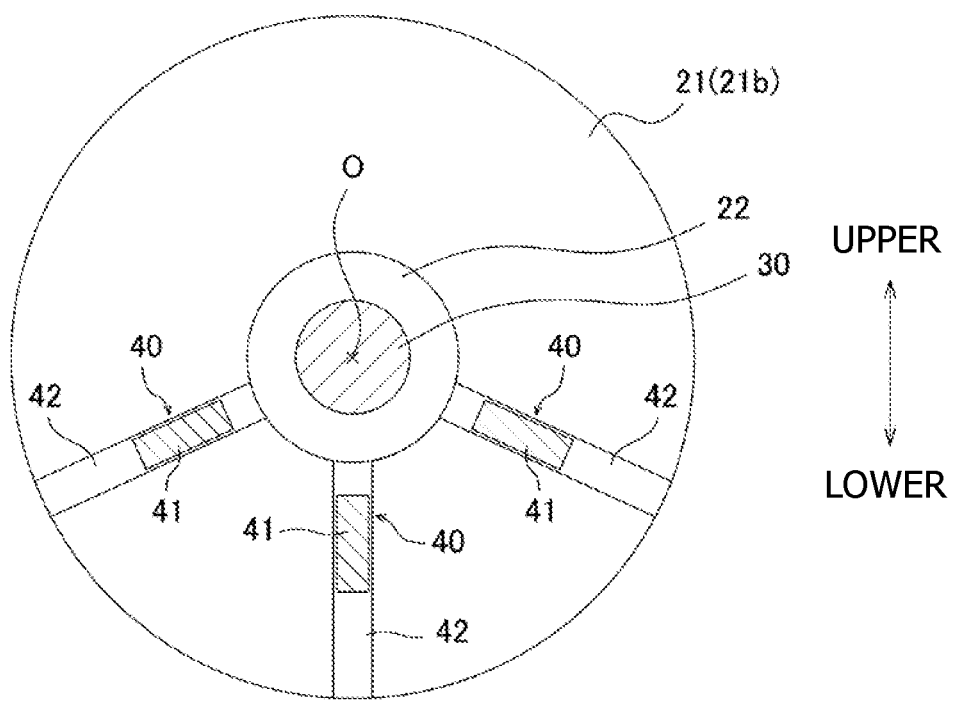
FIG. 4 is a cross-sectional view taken along the line A-A in FIG. 1.

FIG. 4 is a cross-sectional view taken along the line A-A in FIG. 1. As shown in FIG. 4, each engagement mechanism 40 configured by engagement between the protrusion 41 and the recess 42 is obviously arranged in a manner similar to the protrusion 41 and the recess 42. In other words, all the three engagement mechanisms 40 are provided in an area below an axis O of the rotary shaft 30 and are symmetrically arranged with respect to a vertical plane. Furthermore, at least two of the engagement mechanisms 40 are provided to be inclined with respect to each other when viewed in the axial direction of the rotary shaft 30 so that all the three engagement mechanisms 40 may not be arranged in line with or in parallel with one another.

Further, the turbine casing 11 (the cover portion 13) and the gear casing 21 are connected by a bolt (not shown) while being engaged with each other by the engagement mechanisms 40. A bolt hole into which the bolt is to be inserted has a diameter larger than a diameter of the bolt so that when the turbine casing 11 is thermally deformed, such thermal deformation may not be restrained by the bolt. It is not necessary that the turbine casing 11 and the gear casing 21 are connected by the bolt. Alternatively, the turbine casing 11 and the gear casing 21 may be connected by other means.

Figure 5:
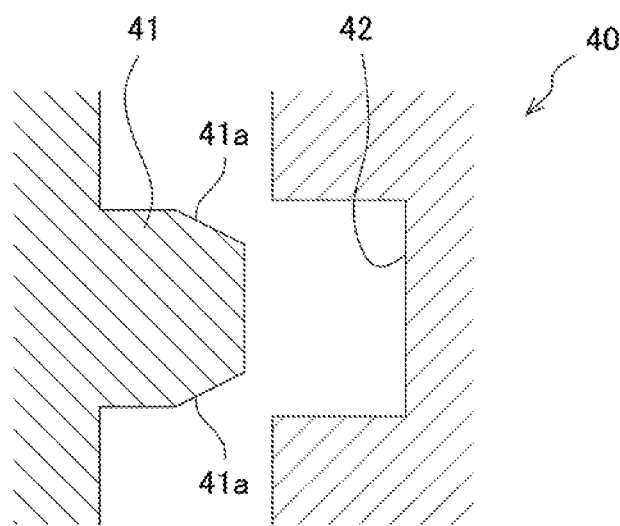
FIG. 5 is a cross-sectional view of an engagement mechanism in cross-section perpendicular to an extending direction
Figure 6:
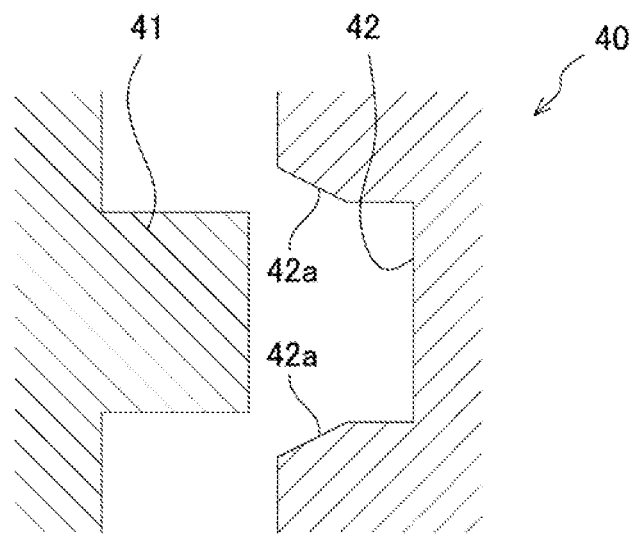
FIG. 6 is a cross-sectional view of the engagement mechanism in cross-section perpendicular to the extending direction.

FIG. 5 and FIG. 6 are each a cross-sectional view of the engagement mechanism 40 in cross-section perpendicular to the extending direction. As shown in FIG. 5, in cross-section perpendicular to the extending direction, edges of an end portion of the protrusion 41 may be processed by chamfering to form taper portions 41a narrowing toward the end portion. The foregoing taper portions 41a are provided; thereby, the protrusion 41 can be easily engaged with the recess 42. Alternatively, as shown in FIG. 6, in cross-section perpendicular to the extending direction, edges of an open face of the recess 42 may be processed by chamfering to form taper portions 42a widening toward the open face. The foregoing taper portions 42a are provided; thereby, the protrusion 41 can be easily engaged with the recess 42. Further, as another embodiment, the edges of the end portion of the protrusion 41 and the edges of the open face of the recess 42 may be processed by chamfering. Furthermore, even if instead of the process of chamfering, at least either the edges of the end portion of the protrusion 41 or the edges of the open face of the recess 42 are processed by round chamfering, an effect similar to that provided by the process of chamfering can be achieved.

Effect

In the rotary machine unit 1 of the present embodiment, at least the two engagement mechanisms 40 are provided to be inclined with respect to each other when viewed in the axial direction of the rotary shaft 30. Therefore, when the turbine casing 11 (a first casing) is subject to a large change of temperature compared to the gear casing 21 (a second casing) and is therefore thermally expanded, the thermal expansion mode is as below. Each of the protrusions 41 (first engaging portions) is guided by a corresponding one of the recesses 42 (second engaging portions) to radially move from an intersection point (corresponding to the axis O of the rotary shaft 30 in the present embodiment) of extended lines of the respective engagement mechanisms 40; thereby the opposing surface 13b of the turbine casing 11 substantially concentrically expands. Accordingly, a displacement is scarcely generated in the center of the opposing surface 13b of the turbine casing 11 through which the rotary shaft 30 extends; therefore, a misalignment of the rotary shaft 30 with respect to the turbine casing 11 can be inhibited. According to the rotary machine unit 1 of the present embodiment, the misalignment of the rotary shaft 30 with respect to the turbine casing 11 can be inhibited likewise in the case of thermal expansion of the turbine casing 11 as well as in the case of thermal shrinkage of the turbine casing 11.

Also, in the present embodiment, the opposing surface 13b of the turbine casing 11 has the circular shape, and the extending direction of the protrusion 41 corresponds to the radial direction of the circular opposing surface 13b. Thus, the intersection point of the extended lines of the respective engagement mechanisms 40 corresponds to the axis O of the rotary shaft 30. Accordingly, the opposing surface 13b of the turbine casing 11 can be further precisely deformed in a concentric fashion. Consequently, the misalignment of the rotary shaft 30 with respect to the turbine casing 11 can be further surely inhibited.

Further, in the present embodiment, the plural engagement mechanisms 40 are symmetrically arranged with respect to the vertical plane; therefore, the turbine casing 11 is easily deformed equally in the right to left direction. Consequently, the turbine casing 11 may be further surely and easily deformed in a concentric fashion.

Still further, in the present embodiment, all of the engagement mechanisms 40 are provided in the area below the axis O of the rotary shaft 30. Therefore, even if the upper half of the gear casing 21 is openable and closable as described above, opening and closing of the gear casing 21 may not be prevented by the engagement mechanisms 40. Also, if the turbine casing 11 (the cover portion 13) is heavy in weight, an operation for establishing the engaged state of the engagement mechanisms 40 may be easily performed with a lower portion of the turbine casing 11 being supported, therefore increasing assembling efficiency.

Further, in the present embodiment, each engagement mechanism 40 is formed by the protrusion 41 and the recess 42; therefore, the engagement mechanism 40 is simply configured. Thus, an increase of costs or man-hours due to setting of the engagement mechanism 40 can be inhibited.

Still further, in the present embodiment, in cross-section perpendicular to the extending direction, at least either the edges of the end portion of the protrusion 41 or the edges of the open face of the recess 42 are processed by chamfering or round chamfering; therefore, the protrusion 41 can be easily engaged with the recess 42.

Other Embodiments

The present invention is not limited to the foregoing embodiment, and without departing from the scope of the present invention, elements of the foregoing embodiment can be combined as required or various modifications can be made in the embodiment as required.

For example, in the foregoing embodiment, a case where "the first casing" of the present invention is the turbine casing 11 of the expansion turbine 10 and "the second casing" of the present invention is the gear casing 21 of the speed increaser 20 is explained as an example. However, the present invention is applicable to a rotary machine unit equipped with a rotary shaft provided to extend through respective opposing surfaces of two casings that are arranged opposite to each other. The first casing and the second casing may be casings of specifically any type of device.

Further, in the foregoing embodiment, a case where "the first engaging portion" of the present invention is the protrusion 41 and "the second engaging portion" of the present invention is the recess 42 is explained as an example; however, the first engaging portion and the second engaging portion are not limited thereto. Alternatively, the first engaging portion may be a recess and the second engaging portion may be a protrusion. Furthermore, as long as the first engaging portion is configured to be guided in the extending direction by the second engaging portion, the first engaging portion and the second engaging portion may be configured as, for example, a combination of a guide means such as a rail and a member engageable with the guide means.

Figure 7:
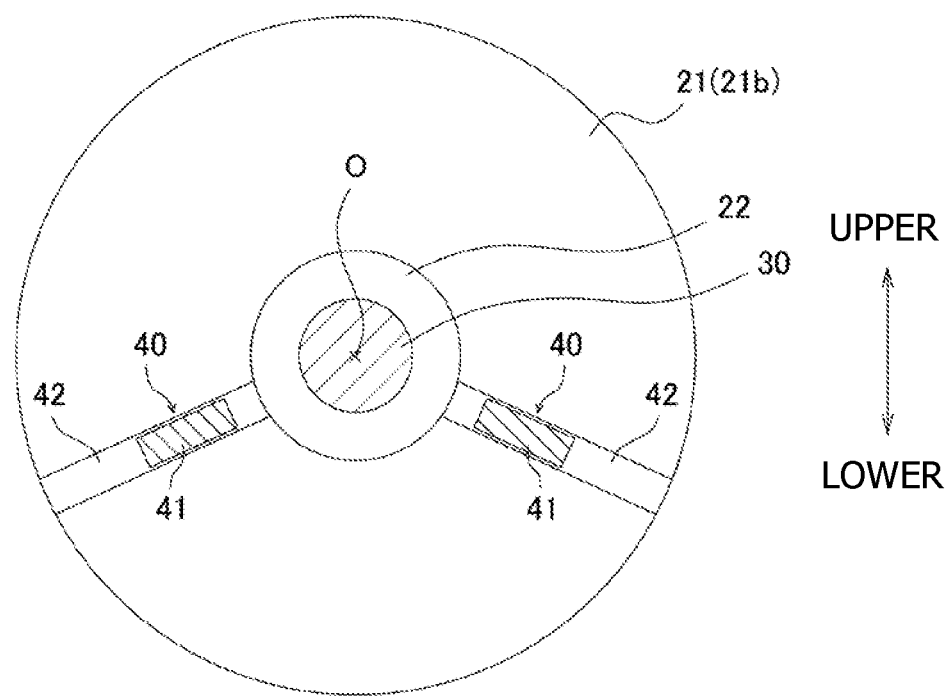
FIG. 7 is a cross-sectional view of an example of the engagement mechanism according to another embodiment.
Figure 8:
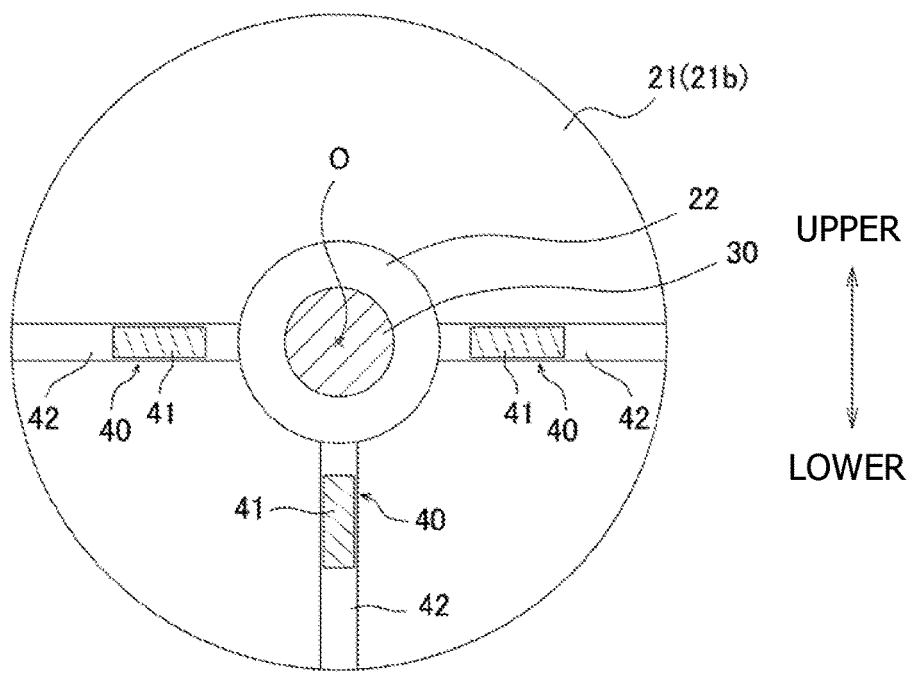
FIG. 8 is a cross-sectional view of an example of the engagement mechanism according to still another embodiment.
Figure 9:
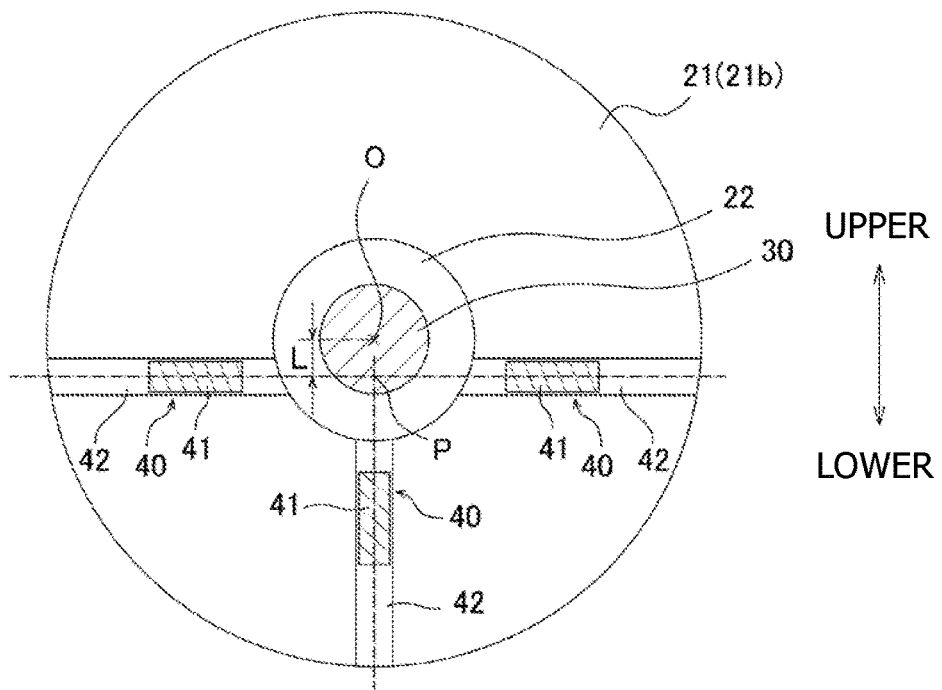
FIG. 9 is a cross-sectional view of an example of the engagement mechanism according to further still another embodiment.

Also, the specific number or arrangement of engagement mechanisms 40 may be changed as required. FIG. 7 to FIG. 9 are each a cross-sectional view showing an example of the engagement mechanism according to another embodiment and corresponding to a cross-sectional view taken along the line A-A in FIG. 1. For example, the engagement mechanism 40 provided in the center as in the foregoing embodiment may be omitted, and meanwhile, the two engagement mechanisms 40 may be provided as shown in FIG. 7. Alternatively, the four or more engagement mechanisms 40 may be provided. Also, if the gear casing 21 is not configured so that the upper half is openable and closable, the engagement mechanisms 40 may be provided in an area above the axis O of the rotary shaft 30. As shown in FIG. 8, the engagement mechanisms 40 can be provided at the same level as the axis O of the rotary shaft 30. In order to allow the opposing surface 13b of the turbine casing 11 to concentrically deform, the three or more engagement mechanisms 40 may be provided at equal intervals in a circumferential direction.

Furthermore, it is not necessary that the extending direction of the engagement mechanism 40 corresponds to the radial direction. Alternatively, the engagement mechanism 40 may be arranged so that the extended lines are slightly displaced from the axis O of the rotary shaft 30. Specifically, for example, as shown in FIG. 9, the two engagement mechanisms 40 arranged to horizontally extend may be displaced from the axis O of the rotary shaft 30 by L [mm]. In such case, the allowable distance L is obtained as below.

When the engagement mechanisms 40 shown in FIG. 9 are provided, the opposing surface 13b of the turbine casing 11 deforms from an intersection point P of the extended lines (indicated by chain lines) of the respective engagement mechanisms 40. Therefore, the amount of displacement ΔL [mm] of the opposing surface 13b in the position of the axis O separated from the intersection point P by L [mm] is obtained from the following formula.

$$\Delta L = \alpha L \Delta T;$$ [Formula 1]

where α is a linear expansion coefficient [1/K] of the turbine casing 11, and ΔT is a temperature change [K] of the turbine casing 11.

For example, when the clearance between the sealing member 15 and the rotary shaft 30 is denoted by G [mm], a relation of the following formula is established. In this case, even if the opposing surface 13b of the turbine casing 11 is thermally deformed and the rotary shaft 30 is therefore misaligned with respect to the turbine casing 11, the rotary shaft 30 can be avoided from making contact with the sealing member 15.

$$\Delta L < G$$ [Formula 2]

Here, when the following condition is given: the turbine casing 11 is made of iron ($\alpha = 1.2 \times 10^{-5}$); ΔT=300° C.; and G=0.5 mm, the following is obtained.

$$L < 0.5/(1.2 \times 10^{-5} \times 300) = 139$$ [Formula 3]

In other words, an allowable displacement from the axis O is up to around 139 mm. Thus, it is not necessary that the extending direction of each engagement mechanism 40 corresponds to the radial direction. As long as the engagement mechanism 40 is provided to extend from the center to the circumferential rim, the present invention is applicable to a case where the extended line of the engagement mechanism 40 is slightly displaced from the axis O of the rotary shaft 30.

EXPLANATION OF REFERENCE NUMERALS

1: rotary machine unit
11: turbine casing (first casing)
13b: opposing surface
21: gear casing (second casing)
21b: opposing surface
30: rotary shaft
40: engagement mechanism
41: protrusion (first engaging portion)
42: recess (second engaging portion)

The invention claimed is:
1. A rotary machine unit comprising:
a turbine casing having an axially-extending sidewall and a radially-extending endwall defining a first surface, and having at least one fluid opening extending through the sidewall that is configured to allow fluid to flow through the turbine casing;
a gear casing having an axially-extending sidewall and a radially-extending endwall defining a second surface that directly faces and engages against the first surface;
a rotary shaft extending through the first and the second surfaces, the rotary shaft being rotatably supported by the gear casing endwall and rotating around a rotational axis and being connected to an impeller disposed within the turbine casing to rotate the impeller; and
at least two sets of corresponding engagement mechanisms, each set of engagement mechanisms including:

a first engaging portion provided on the first surface of the turbine casing and comprising one of a radially-extending protrusion and a corresponding radially-extending recess, which linearly extends in a lengthwise direction of the first engaging portion in a radial direction from the rotational axis of the rotary shaft; and a second engaging portion provided on the second surface of the gear casing and comprising the other of the radially-extending protrusion and the corresponding radially-extending recess, which linearly extends in a lengthwise direction of the second engaging portion in a radial direction from the rotational axis of the rotary shaft, wherein the first engaging portion is engaged movably with the second engaging portion in the extending direction of the first and second engaging portions and is configured to move relative to the second engaging portion due to thermal expansion of the turbine casing in the radial direction relative to the gear casing; and wherein the sets of corresponding engagement mechanisms are spaced and inclined with respect to each other when viewed in an axial direction of the rotary shaft, and cooperate to inhibit misalignment of the rotary shaft with respect to the turbine casing due to thermal expansion of the turbine casing.

2. The rotary machine unit according to claim 1, wherein the first surface of the turbine casing has a circular shape.

3. The rotary machine unit according to claim 2, wherein all of the engagement mechanisms are provided in an area below the rotational axis of the rotary shaft.

4. The rotary machine unit according to claim 1, wherein the plurality of engagement mechanisms are symmetrically arranged with respect to a vertical plane.

5. The rotary machine unit according to claim 4, wherein all of the engagement mechanisms are provided in an area below the rotational axis of the rotary shaft.

6. The rotary machine unit according to claim 1, wherein all of the engagement mechanisms are provided in an area below the rotational axis of the rotary shaft.

7. The rotary machine unit according to claim 1, wherein in cross-section perpendicular to the extending direction, at least one of an edge of an end portion of the protrusion and an edge of an open face of the recess is chamfered or rounded.

* * * * *